April 18, 1967  R. B. FLAY  3,314,969
PROCESS FOR THE PREPARATION OF N-POLYHALOETHYLTHIO COMPOUNDS
Filed May 3, 1965
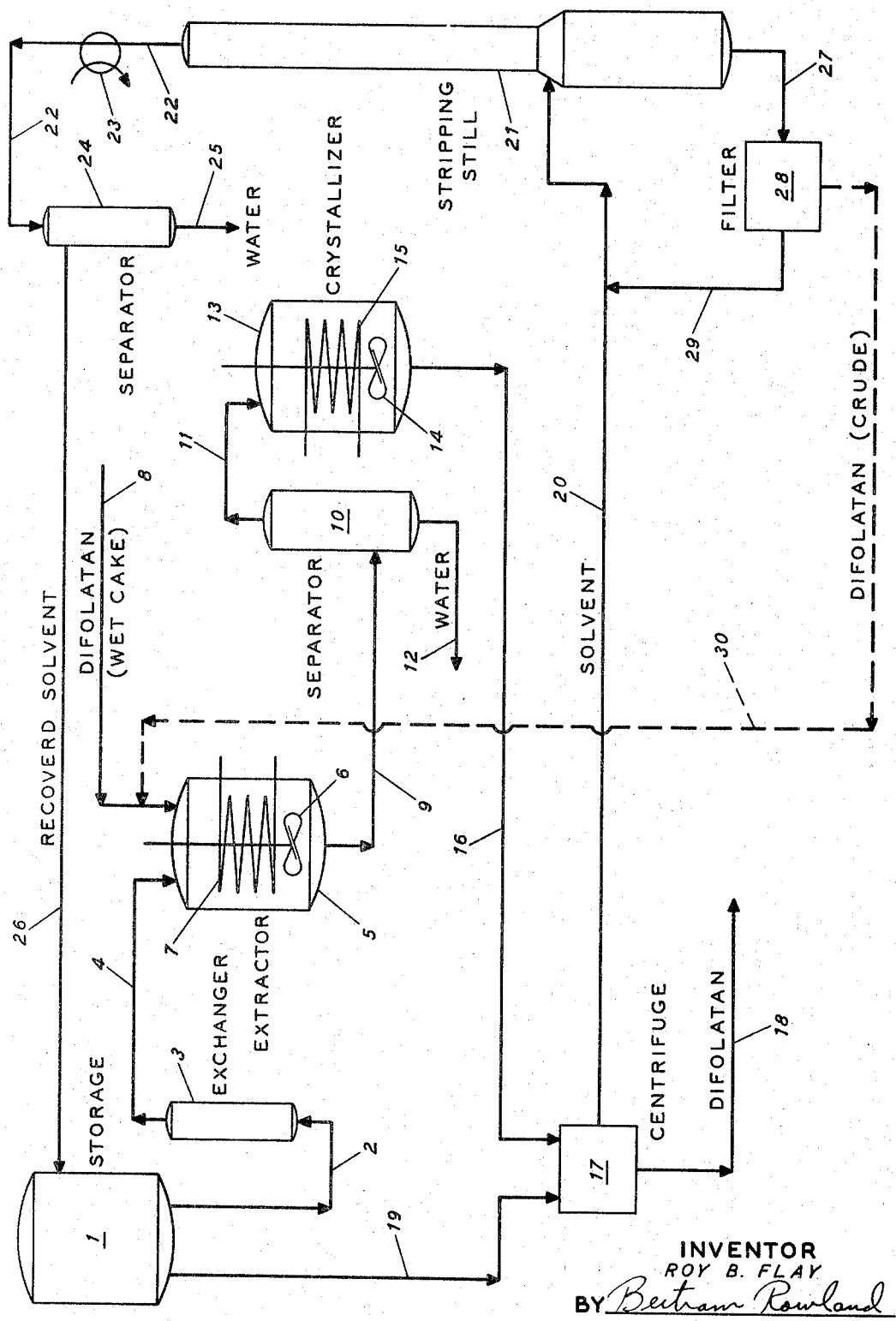
INVENTOR
ROY B. FLAY
BY *Bertram Rowland*
ATTORNEY

United States Patent Office 3,314,969
Patented Apr. 18, 1967

3,314,969
PROCESS FOR THE PREPARATION OF N-POLY-HALOETHYLTHIO COMPOUNDS
Roy B. Flay, Concord, Calif., assignor to Chevron Research Company, a corporation of Delaware
Filed May 3, 1965, Ser. No. 456,027
6 Claims. (Cl. 260—326)

This application is a continuation-in-part of my co-pending application Ser. No. 298,628 filed July 30, 1963 and now abandoned.

This invention concerns an improved method for the preparation of N-polyhaloethylimides. More particularly, the invention concerns an improved process for the preparation of N-polyhaloethylthio compounds wherein the sulfur is bonded to a nitrogen which is bonded to an acyl group.

Compounds having the $>$N—S—CCl$_3$ group are well known in the art. Two of these compounds, captan (N-trichloromethylthio-cis - $\Delta^4$ - tetrahydrophthalimide) and Phaltan (N-trichloromethylthiophthalimide), have been commercially exploited. These compounds have found worldwide acceptance as fungicides. Numerous patents have issued which include compositions containing the N-trichloromethylthio group, their uses, and improved methods for their preparation. Some of the U.S. patents include Nos. 2,553,771, 2,553,773–6, 2,713,058 and 2,790,749.

The method of preparation orginally disclosed merely added trichloromethylsulfenyl chloride to an aqueous solution of the salt of imide and isolated the resulting product as a precipitate. Improved modifications used alkali metal salts in the aqueous phase and added the trichloromethylsulfenyl chloride diluted in an aliphatic hydrocarbon solvent to the aqueous solution of the imide.

A new series of fungicides which are significantly superior to the earlier fungicides based on the N-trichloromethylthio group have recently been developed. For convenience, these new compounds may be thought of as consisting of two groupings. The grouping of most importance in this invention is a polyhaloethylthio group wherein at least one halogen is in the "$\alpha$" position, i.e., bonded to the carbon which is bonded to the sulfur. The polyhaloethylthio group is bonded to the second group, an N-acyl functionality, via the nitrogen of this latter group. The N-acyl grouping is only of peripheral significance in the present invention. Its structure will depend upon that of the acyl nitrogen precursor used in the preparation of the new N-polyhaloethylthio compounds.

The following formulae describe some of the preferred compounds to which the unique process of this invention applies.

(I)

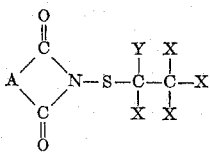

wherein Y is halogen of atomic number 17 to 35, i.e., chlorine or bromine, and X is either hydrogen, chlorine or bromine, with the proviso that at least 2 X's are halogen, preferably one X on the beta carbon is hydrogen and the remaining are halogen, and A is a divalent radial of from 1 to 10 carbons, preferably of from 1 to 6 carbons, and having from 0 to 1 heteroatoms, either oxygen or nitrogen. A may have both aliphatic and aromatic unsaturation, but the aliphatic unsaturation will usually be olefinic unsaturation.

A of Formula I can be both a cyclic divalent radical and an acyclic divalent radical. Among the cyclic radicals, those having from 4–6 carbon atoms in the ring are preferred, with hexacarbocyclic being particularly preferred. The cyclic radicals may be saturated or unsaturated. For instance, the six-membered ring may have from 0 to 3 double bonds.

Considering the preferred hexacarbocyclic derivative as a derivative of phthalimide, the compounds may be phthalimide, dihydrophthalimide, tetrahydrophthalimide and hexahydrophthalimide (cyclohexane-1,2-dicarboximide). The empirical formula for the divalent hexacarbocyclic radical is C$_6$H$_{2n}$, wherein $n$ varies from 2 to 5.

Among the acyclic divalent organic radicals are

wherein R is either hydrogen or lower alkyl, (CH$_2$)$_n$, wherein $n$ varies from 2 to 3, i.e., dimethylene and trimethylene, —CH=CH— and dimethyleneoxy (—CH$_2$OCH$_2$—)

The following are specific examples of compounds which fall within those represented by Formula I:

N-(1,1,2,2-tetrachloroethylthio)-cis-$\Delta^4$-cyclohexene-1,2-dicarboximide
N-(1,1,2,2-tetrachloroethylthio)-cyclohexane-1,2-dicarboximide
N-(1,1,2,2-tetrachloroethylthio)-phthalimide
N-(1,1,2,2-tetrachloroethylthio)-cyclobutane-1,2-dicarboximide
N-(pentachloroethylthio)-cis-$\Delta^4$-cyclohexene-1,2-dicarboximide
N-(2-bromo-1,2,2-trichloroethylthio)-phthalimide
N-(1,1,2-trichloroethylthio)-4,5-dibromocyclohexane-1,2-dicarboximide
N-(1,2,2-trichloroethylthio)-phthalimide
N-(2-chloro-1,2-dibromoethylthio)-cyclopentane-1,2-dicarboximide
3-(1,1,2,2-tetrachloroethylthio)-5,5-dimethylhydantoin
3(1,1,2-trichloroethylthio)-hydantoin
3-(2-bromo-1,1,2-trichloroethylthio)-5,5-dibutylhydantoin
3-(2-chloro-1,1,2-tribromoethylthio)-hydantoin
3-(1,1,2,2-tetrachloroethylthio)-hydantoin
3-(pentachloroethylthio)-5,5-diethylhydantoin
N-(1,1,2,2-tetrachloroethylthio)succinimide
N-(1,1,2-tribromoethylthio)succinimide
N-(1,2,2,2-tetrachloroethylthio)glutarimide
N-(1,1,2,2-tetrachloroethylthio)glutarimide
N-(2-chloro-1,1,2-tribromoethylthio)diglycolimide
N-(1,1,2,2-tetrachloroethylthio)diglycolimide
N-(1,1,2,2-tetrachloroethylthio)maleimide
N-(1,1,2-trichloroethylthio)maleimide;

(II)

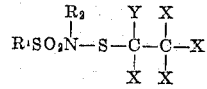

wherein R$^1$ may be hydrocarbyl, aliphatic and aromatic, halohydrocarbyl and dialkylamino and will generally be of not more than 10 carbons, preferably not more than 7 carbons. R$^2$ is hydrocarbyl, both aliphatic and aromatic, and halohydrocarbyl, also of from about 1 to 10 carbons. Preferred halogen for R$^1$ and R$^2$ is chlorine. The X and Y of Formula II are as defined in Formula I.

The following are specific examples of compounds which fall within those represented by Formula II:

N-4-chlorophenyl-N-(1,1,2,2-tetrachloroethylthio)ethanesulfonamide
N-methyl-N-(1,2,2-trichloroethylthio)dimethylaminosulfonamide
N-phenyl-N-(pentachloroethylthio)benzenesulfonamide
N-butyl-N-(2-bromo-1,1,2-trichloroethylthio)-4-chlorobenzensulfonamide N-ethyl-N-(1,2,-dibromo-1,2-dichloroethylthio)-dibutyl-aminosulfonamide
N-phenyl-N-(1,1,2,2-tetrachloroethylthio)-butanesulfonamide
N-chloroethyl-N-(1,1,2,2-tetrachloroethylthio)-benzenesulfonamide
N-hexyl-N-(1,2,2,2-tetrachloroethylthio)-4-bromobenzenesulfonamide
N-4-bromophenyl-N-(pentachloroethylthio)-hexanesulfonamide In the preparation of the above compounds, a salt of an acidic nitrogen compound having the formula

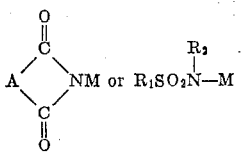

is dissolved in a polar solvent. $R_1$, $R_2$ and A are as previously defined and M is an alkaline or alkaline earth metal cation. Whenever possible, water is used as the solvent. However, alcohol, acetone, etc., can find use, particularly as aqueous solvents.

The salt of the acidic nitrogen compound may be formed in situ or prepared previously and then dissolved in the polar solvent. Preferred salts are alkali metal salts, particularly sodium and potassium salts. The salt of the acidic nitrogen compound may be readily prepared in situ by adding a stoichiometric amount or slight excess of an alkali metal hydroxide compound together with the acidic nitrogen compound and dissolving the two in the polar solvent.

A polyhaloalkylsulfenyl chloride of the formula

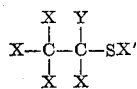

wherein X and Y are as previously defined and X' is halogen of atomic number 17 to 35, i.e., chlorine or bromine, is then added as a heterogeneous phase to the aqueous solution, usually in stoichiometric amount or slightly less. It can be added neat or dissolved in an inert hydrocarbon solvent, such as hexanes. The mixture is rapidly stirred and the resulting polyhaloalkylthio compound precipitates to the bottom of the flask. The temperature is usually maintained in the range of about −10° to 25° C. Most of the polar solvent can be removed by decantation or centrifugation followed by decantation, and the resulting slurry may be dried by means known in the art.

Previously, when trichloromethylsulfenyl chloride was used in a process similar to that heretofore described, the product was obtained in a relatively pure manner and free of odoriferous materials. However, when polyhaloethylthio compounds, particularly 1,1,2,2-tetrachloroethylthio compounds, analogous to the trichloromethyl compounds were prepared, the products had an extremely disagreeable odor. The odor was not only disagreeable, but had long persistence, and when the product was used in the field, the odor was found to remain with the agricultural products after harvest.

Apparently, the odor was caused by compounds having a low volatility and solubility properties similar to the polyhaloethylthio nitrogen compounds. This experience was totally different from that obtained with the N-trichloromethyl group. There had been no problem of odor forming contaminants. The major problem was that the N-trichloromethylthio imide compounds, e.g., captan or Phaltan, were extremely susceptible to hydrolysis. In the presence of water at alkaline pH and elevated temperatures the imide was rapidly hydrolyzed. U.S. Patent 2,653,155. By careful control of the pH and temperature, using relatively low temperatures, the hydrolysis was minimized. The problem existed, therefore, with the N-polyhaloethylthio compounds of removing the impurities while minimizing loss and decomposition of product.

It has now been found that these and other difficulties in the process of the preparation of N-polyhaloethylthio compounds can be avoided by contacting the polar solvent dispersion with an aromatic hydrocarbon solvent of from 6 to 10 carbons at a temperature in the range of about 50° to 100° C. for a time sufficient to dissolve substantially all of the N-polyhaloethylthio compound, separating the aqueous phase from the organic phase and then cooling the organic phase and isolating the pure N-polyhaloethylthio compound. The product as obtained is almost totally free of odoriferous compounds and is of high purity, with negligible amounts of hydrolysis products present.

The polar solvent dispersion, usually an aqueous dispersion, may be either a wet cake or a slurry. When this mixture is in the form of a wet cake, i.e., non-flowing and predominantly solids, the term "dispersion" is meant to describe a mixture wherein the polar solvent is dispersed in the solid N-polyhaloethylthio compound and other solids present. On the other hand, when the mixture is in the form of a slurry, the term "dispersion" is intended to describe a mixture wherein the solid product and by-products are dispersed in the polar solvent. The mixture or dispersion will contain at least 35 weight percent polar solvent, more usually from about 45 to 90 weight percent polar solvent, with the balance being crude solid polyhaloethylthio compound and up to about 5 weight percent unreacted reactants and by-product, usually sodium chloride.

The material used for purifying is an aromatic hydrocarbon of from 6 to 10 carbons. Aromatic solvents within this range include benzene, toluene, ortho-, meta-, para-xylene, mesitylene, cumene, cymene, tert.-butylbenzene, etc. Preferred solvents are those of from 7 to 8 carbons, i.e., toluene, ortho-, meta-, and para-xylene and mixtures thereof. Usually, at least 2 parts of aromatic solvent per part of the polyhaloethylthio compound present in the dispersion will be used; preferably, from about 4 parts to 15 parts of aromatic solvent will be used. Rarely, will the amount of aromatic solvent exceed 20 parts per part of polyhaloethylthio compound.

The temperature will depend to a great degree on the amount of solvent used. The temperatures will usually be at least 45° C. and preferably about 50° C. The temperature will rarely exceed 110° C. and preferably will not exceed 100° C. Preferred temperatures are those in the range of about 50° to 85° C.

The time for dissolution will generally require at least 3 minutes. When the process is on a continuous basis, dissolution will usually be at least 5 or 10 minutes. When a batch technique is being used as much as one-half hour or one hour will be required, but the time for dissolution will rarely exceed 2 hours. Usually, the minimum amount of time will be used in which to dissolve all of the N-polyhaloethylthio compound. Once the solid is dissolved, the hot heterogeneous solution (organic phase and aqueous phase) is transferred to a separator in which the aqueous liquor can be drawn off, leaving the organic phase. The organic phase can then be cooled, usually to a temperature in the range of about 0° to 40° C., more usually in the range of 10° to 30° C.

The purified N-polyhaloalkylthio compound can then be isolated by centrifugation, filtration, etc., there being various ways well known in the art.

The product can now be readily dried since the aromatic hydrocarbons are easily removed from the solid material. The lower aromatic hydrocarbons, those of 7 to 8 carbons, are particularly easily removed and are to that degree preferred. Use of these hydrocarbons has great advantages in drying. Where previously as much as 90% by weight of the dispersion was water, with the present technique, volatiles (water, aromatic hydrocarbon, etc.) are usually less than 5%, and often as low as 2%. In most instances the product will be micronized; the micronization is found to remove the volatiles to a satisfactory degree for a commercial product. If micronization is not intended, drying can be readily achieved by maintaining the product at about 65°–80° C. for about one-half to two hours.

When drying the N-polyhaloalkylthio compounds, without the use of the hydrocarbon treatment, there had been a problem of air pollution. Noxious fumes were given off which required the closing of the plant. Major changes in the mechanism of drying would have been required, if the method of drying used for the N-trichloromethylthio compound was followed. The process of this invention obviated the problem of air pollution.

The aromatic hydrocarbon can be recovered by distillation. The N-polyhaloalkylthio compound remaining as a residue can also be recovered and recrystallized to obtain the desired purified product. In this way, recovery of at least 90% or higher of the N-polyhaloalkylthio compound is obtained as a pure compound free of odoriferous materials and having a high bioassay.

In the accompanying drawing, there is shown a flow diagram of the process. In the drawing 1 represents a storage vessel for the aromatic hydrocarbon. The aromatic hydrocarbon is transferred through line 2 to heat exchanger 3 in which it is heated to the desired temperature. The hot hydrocarbon is then transferred through line 4 to the extractor 5 which is equipped with agitating means 6 and heating means 7. The product as a dispersion, i.e., wet cake or slurry, is introduced into the extractor 5 through line 8. After the product has been completely dissolved, the two phases are transferred hot through line 9 to phase separator 10.

The organic phase is removed from the separator 10 by means of line 11 to the crystallizer 13, while the aqueous phase is drawn out through line 12 and discarded. The crystallizer 13 is equipped with agitating means 14 and cooling means 15. The organic phase is cooled to the desired temperature and the slurry removed through line 16 to centrifuge 17. Other means for separating the solid from the liquid may be used such as filtration at this point. The solids can then be removed through line 18 and dried by various means known in the art. If desired, the solid may be washed with additional solvent which can be introduced through line 19 from storage vessel 1.

The solvent from the centrifuge 17 is transferred through line 20 to still 21 fitted with condenser head 23. The solvent passes from still 21 to condenser 23 and then to phase separator 24 through line 22. From phase separator 24, any water is removed through line 25 and the recovered solvent transferred through line 26 to storage vessel 1. The residue in the still containing small amounts of product is transferred through line 27 to filter 28. Other means may be used such as centrifuge, etc., to separate the liquid from the solid phase. The solvent obtained from centrifuge 28 is transferred through lines 29 and 20 to still 21 to be redistilled. The solid product which is in a crude form may then be carried through line 30 to crystallizer 5 for further purification.

The following examples illustrate the methods of preparing an exemplary N-polyhaloethylthio compound, N-1,1,2,2 - tetrachloroethylthio - $\Delta^4$ - tetrahydrophthalimide. These examples are offered as illustrative of typical preparations of a preferred N-polyhaloethylthio compound. They are offered by way of illustration and not by way of limitation.

*Example 1*

A solution of the $\Delta^4$-tetrahydrophthalimide was prepared by dissolving 150 parts of $\Delta^4$-tetrahydrophthalimide in a solution having 45 parts of sodium hydroxide and 4,000 parts of water. The solution was then cooled to about 2° C. and fed into a reaction vessel fitted with a high speed stirrer and maintained at a temperature from about 10° to 15° C. The 1,1,2,2-tetrachloroethylsulfenyl chloride was added at a rate which would maintain a stoichiometric equivalent of the imide salt and the sulfenyl halide. The resulting aqueous slurry of N-(1,1,2,2-tetrachloroethylthio)-$\Delta^4$-tetrahydrophthalimide was filtered, leaving a wet cake of the N-1,1,2,2-tetrachloroethylthio-$\Delta^4$-tetrahydrophthalimide containing about 35% water by weight.

N - 1,1,2,2 - tetrachloroethylthio - cis - $\Delta^4$ - tetrahydrophthalimide was obtained as a wet cake weighing 9405 pounds, having 62% crude product with an analytical purity of 89.5%. To this mixture was added 4230 gallons of toluene and the mixture refluxed for one hour. The organic phase was separated hot from the aqueous phase and then cooled to 70°–75° F. The product was filtered, yielding 4314 pounds (81.3%) of product of 97% purity. The yield could be further enhanced by recycling the toluene, increasing the yield to about 95%.

(Analysis of the product was obtained by chromatographing the material on silicic acid; eluting with an ether-benzene mixture; boiling off the solvent to leave a small residue; adding sodium biphenyl reagent followed by hydrogen peroxide; boiling until only an oil remains, then cooling; adding concentrated nitric acid to slight excess after neutrality; titrating for halogen with silver nitrate.)

In the above run, N-1,1,2,2-tetrachloroethylthio-$\Delta^4$-tetrahydrophthalimide was prepared. This compound was free of any offensive odor. The compound when transferred to the field to be used in the protection of various crops which are harvested, such as fruits, was found not to impart any offensive odor to the fruit.

*Example 2*

A 1 molar aqueous solution of the sodium salt of $\Delta^4$-tetrahydrophthalimide was fed to a reaction vessel at a rate of 10.1 pounds solution per minute and reacted with 1,1,2,2-tetrachloroethylsulfenyl chloride which was being fed simultaneously at a rate of 2.0 pounds per minute. The temperature in the vessel was maintained at 90°–120° F. The slurry from this vessel contained 20.6 weight percent N-(1,1,2,2-tetrachloroethyl)-$\Delta^4$-tetrahydrophthalimide, 5.0 weight percent sodium chloride with the remainder being water and impurities. This slurry was discharged to a stirred surge tank and from there was fed at a rate of 12.1 pounds per minute to a dissolving vessel maintained at 140°–150° F. Simultaneously, a toluene solvent preheated to a temperature of 170° F. was pumped into the dissolving vessel. The solution from this dissolver was then discharged to a second dissolving vessel where it was heated to 170°–175° F. From the second dissolving vessel the solution was discharged into a settling tank kept at 160°–165° F. The aqueous phase was drained off the settling tank at a rate of 1.0 gallons per minute. The overflow from the settling tank was discharged into another vessel where it was cooled to 135° F. thus forming a slurry. This slurry was transferred to another vessel and cooled further to 70° F. The cooled slurry was batch-pumped to a centrifuge once an hour from which 165 pounds of wet N-(1,1,2,2-tetrachloroethyl) - $\Delta^4$ - tetrahydrophthalimide was recovered. This wet product was dried leaving 150 pounds of N-(1,1,2,2 - tetrachloroethyl) - $\Delta^4$ - tetrahydrophthalimide which was analyzed as 96–97% pure.

As will be evident to those skilled in the art, various modifications on this process can be made or followed, in the light of the foregoing disclosure and discussion, without departing from the spirit or scope of the disclosure or from the scope of the following claims.

I claim:
1. In the process for making N-polyhaloethylthio compounds wherein an acyl nitrogen compound of the formula

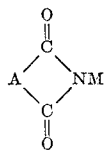

wherein M is an alkali metal cation and A is a divalent radical of from 1 to 10 carbons and having from 0 to 1 heteroatoms selected from the group consisting of oxygen and nitrogen is reacted in the presence of a polar solvent, with a polyhaloethylsulfenyl halide of the formula

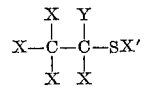

wherein X' and Y are halogen of atomic number 17 to 35, and X is selected from the group consisting of hydrogen and halogen of atomic number 17 to 35, with the proviso that at least 2 X's are halogen, to form a reaction mixture comprising as a solid product an N-polyhaloethylthio compound of the formula

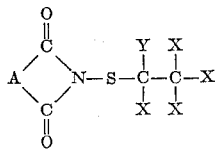

wherein A, Y and X are as previously defined; the improved purification procedure which comprises isolating said N-polyhaloethylthio compound from the aforesaid reaction mixture as a polar solvent dispersion; contacting said dispersion with an aromatic hydrocarbon solvent of from 6 to 10 carbons at a temperature in the range of about 50° to 100° C. for a time sufficient to dissolve substantially all of the N-polyhaloethylthio compound; separating the polar solvent phase from the aromatic hydrocarbon solvent phase; cooling the aromatic hydrocarbon phase and isolating therefrom the purified N-polyhaloethylthio compound.

2. A method according to claim 1 wherein said dispersion contains at least 35 weight percent polar solvent and said aromatic hydrogen is present in at least 2 parts per part of said N-polyhaloethylthio compound.

3. The process according to claim 1 wherein said polar solvent is an aqueous polar solvent, and said aromatic hydrocarbon solvent is toluene.

4. The process according to claim 3 wherein A is

and said polyhaloethylsulfenyl halide is 1,1,2,2-tetrachloroethylsulfenyl chloride.

5. In the process for making N-polyhaloethylthio compounds wherein an acyl nitrogen compound of the formula

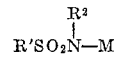

wherein M is an alkali metal cation, R' is a radical of not more than 10 carbons and is selected from the group consisting of aliphatic hydrocarbyl, aromatic hydrocarbyl, halohydrocarbyl and dialkylamino and $R^2$ is a radical of not more than 10 carbons and is selected from the group consisting of aliphatic hydrocarbyl, aromatic hydrocarbyl and halohydrocarbyl, is reacted in the presence of a polar solvent with a polyhaloethylsulfenyl halide of the formula

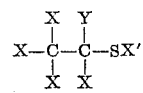

wherein X' and Y are halogen of atomic number 17 to 35, and X is selected from the group consisting of hydrogen and halogen of atomic number 17 to 35, with the proviso that at least 2 X's are halogen, to form a reaction mixture comprising as a solid product an N-polyhaloethylthio compound of the formula

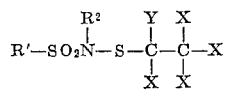

wherein R', $R^2$, Y and X are as previously defined; the improved purification procedure which comprises isolating said N-polyhaloethylthio compound from said reaction mixture as a polar solvent dispersion; contacting said dispersion with an aromatic hydrocarbon solvent of from 6 to 10 carbons at a temperature in the range of about 50° to 100° C. for a time sufficient to dissolve substantially all of the N-polyhaloethylthio compounds; separating the polar solvent phase from the aromatic hydrocarbon solvent phase; cooling the aromatic hydrocarbon phase and isolating therefrom the purified N-polyhaloethylthio compound.

6. The method according to claim 5 wherein said polar solvent is an aqueous solvent and said aromatic hydrocarbon is toluene.

References Cited by the Examiner
UNITED STATES PATENTS 2,856,410  10/1958  Kittleson et al _____ 260—326 X
3,178,447  4/1965  Kohn _____ 260—326 X ALEX MAZEL, *Primary Examiner.*

MARY U. O'BRIEN, *Assistant Examiner.*